May 20, 1952     R. D. COWHERD     2,597,621
LIQUID DENSITY APPARATUS
Filed March 28, 1946
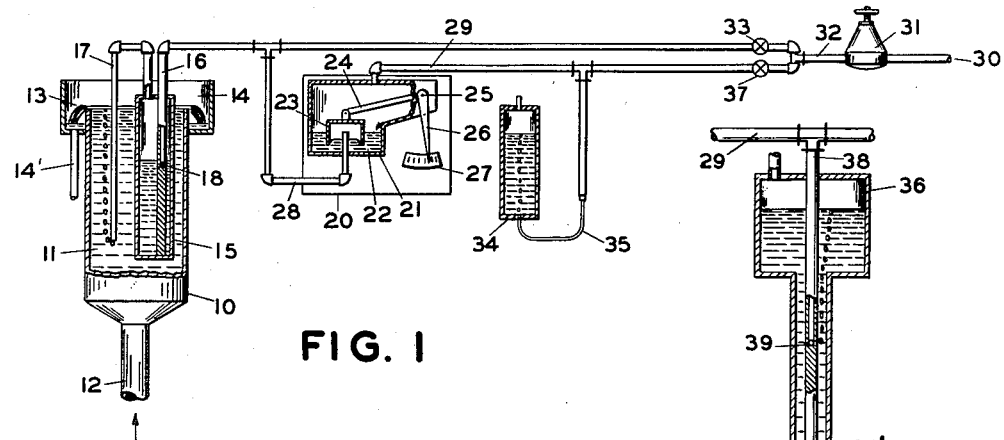
FIG. 1
FIG. 3
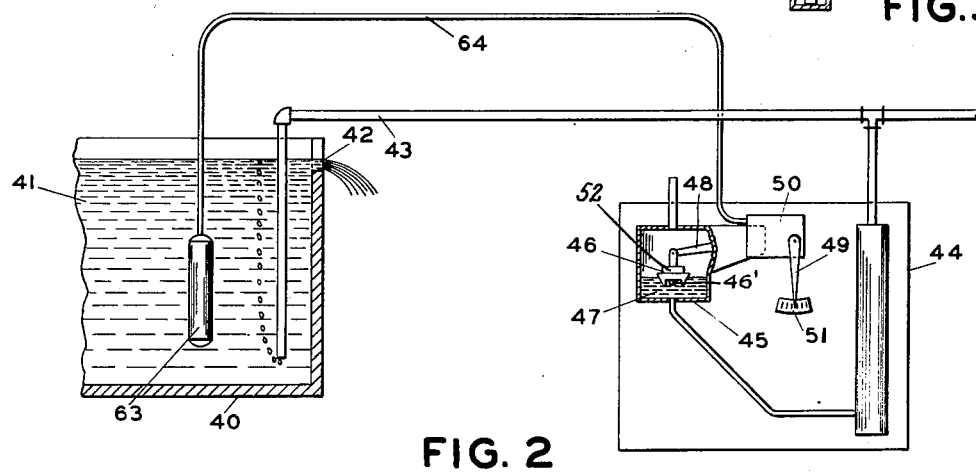
FIG. 2
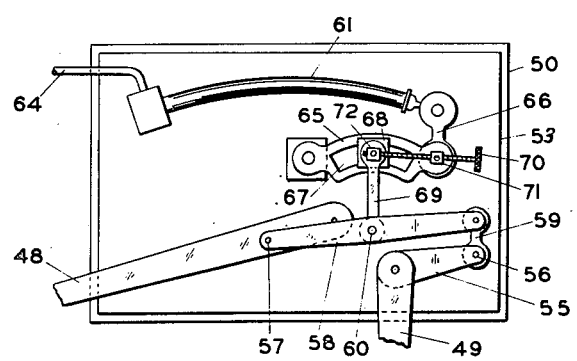
FIG. 4
INVENTOR.
Robert D. Cowherd
BY
E. C. Sanborn
Attorney Patented May 20, 1952

2,597,621

UNITED STATES PATENT OFFICE 2,597,621

LIQUID DENSITY APPARATUS

Robert D. Cowherd, Atlanta, Ga., assignor to The Bristol Company, Waterbury, Conn., a corporation of Connecticut Application March 28, 1946, Serial No. 657,746

10 Claims. (Cl. 73—32)

This invention relates to liquid density apparatus, and more especially to a device for determining the density or specific gravity of a liquid by causing a stream of air or other gaseous medium to be bubbled upward through a predetermined depth of said liquid and measuring the pressure necessary to effect said bubbling. This method of determining specific gravity of a liquid is well-known, and has been fully set forth in U. S. Letters Patent No. 1,248,972, issued to I. J. Witham and G. E. Mayo, December 4, 1917. In such devices there is immersed in the liquid whose density is to be measured an air container open at the bottom and connected with a supply from which air under steady pressure is constantly supplied to the container. This air is permitted to escape through the open bottom of the container into the liquid and to bubble upwards therethrough. Various densities of liquid will offer more or less resistance to the escape of air; and, so long as the surface of the liquid is maintained at a definite level with respect to the open bottom of the air container, the pressure in said container may be used as a measure of the density of the liquid. As an alternative to maintaining the liquid surface at a definite level, there may be established a fixed head by the expedient of utilizing two bubbling tubes having their outlets a definite vertical distance apart and measuring the difference of pressure between them by a suitable differential manometer. Such a device is set forth in U. S. Letters Patent No. 1,460,134, granted to J. M. Johlin, June 26, 1923.

In most of the liquid density determinations encountered in industrial practice, the variations which form the basis of measurement will lie within a few percent of the normal specific gravity of the material; and if the pressure-measuring instrument were to be provided with a complete range from zero to the value under consideration, the measurement would proceed from a zero datum density, in which case only a small fraction of the scale or chart would be used. It is customary, therefore, to resort to some form of "zero suppression," so that the range of measured values will correspond to that of density variation as referred to a standard condition, the whole range of the instrument being thereby narrowed, and the sensitivity of measurement correspondingly increased. The manner of accomplishing zero suppression will to some extent depend upon the class of pressure measuring instrument, or manometer, used; and two such methods will be set forth as the invention is hereinafter described.

The density of a liquid varies with its temperature; and where density measurement is to be utilized as a basis of determining the amount of dissolved or suspended solids, its use as an index of concentration is limited unless thermal effects are considered. Therefore, in the industrial use of a density meter it becomes important to provide means for compensating for such temperature effects as it is desired to exclude from the measurement, or, in other words, to reduce the density determination to a standard reference temperature.

It is an object of the present invention to provide compensating means whereby liquid densities determined by the bubbling or back-pressure method shall be expressed in terms of an identical liquid at a standard reference temperature.

It is a further object to provide means of the above nature, wherein said compensation shall be continuously effected without the interposition of manual adjustment.

A more specific feature comprises the provision of compensating means whereby the density measurement is referred to the lowest temperature to which the sample may be subjected, and the back pressure developed by bubbling a gaseous medium through said sample at any higher temperature will have added thereto a static pressure equal to that lost due to the reduction in density of the sample in response to said temperature increase. A further specific feature resides in the effecting of the desired compensation by the use of an auxiliary bubbling tube "in series" with the measuring tube, immersed in a body of liquid maintained at the same temperature as that of the sample, and disposed in such a manner that by the change in head due to temperature variations it will have developed therein such increments of pressure as are necessary to neutralize the loss.

Other features and advantages of the invention will be hereinafter described and claimed.

In the accompanying drawings:

Fig. 1 is a diagrammatic representation of a liquid density meter embodying the principles of the invention.

Fig. 2 is an alternative form of meter embodying said principles.

Fig. 3 is a sectional view of an alternative form of an element of the device shown in Fig. 1.

Fig. 4 is a representation to an enlarged scale, of an element of the mechanism utilized in the form of the invention shown in Fig. 2.

Referring now to the drawings:

The numeral 10 designates a sampling chamber to contain a sample of a liquid whose density is to be determined. The liquid or "stuff" 11 is circulated through the chamber 10 by a pump or equivalent means not shown in the drawing, entering said chamber through an opening 12 at its bottom, and flowing over a weir 13 into a trough or launder 14, from which it is suitably drained away. With a constant rate of circulation, the weir 13 assures that the level of the material in the chamber 10 shall at all times be substantially constant. Positioned within the chamber 10, so as to be wholly or partially submerged in the contents thereof is a closed chamber 15 having in communication with the interior thereof two tubes or conduits 16 and 17. The walls of said chamber 15 are of any suitable low thermal coefficient of expansion, heat-conducting material whereby temperature changes in the liquid 11 are communicated to the liquid in said chamber 15. The conduit 16 passes through the top of the chamber 15 and extends, as a hollow cross-section, to point 18. In order to maintain the column of liquid in chamber 15 of a uniform cross-section area throughout its depth, whereby the ratio between linear and volumetric expansion will remain constant, the conduit 16 below the point 18 is extended preferably to the bottom of the chamber 15 in the form of a solid rod or cross-section. Both components are vertically disposed and of uniform diameter. Pierced through the side of conduit 16, within the chamber 15, at the junction of the hollow and solid cross-sectional members of conduit 16, is a small opening or orifice 18, the position of which will hereinafter be set forth. The tube 17 terminates within the upper portion of the chamber 15, and extends downwardly into the chamber 10, terminating at a predetermined distance below the level established by the weir 13. It will be seen that air or other gaseous medium admitted to the system through the tube 16 will pass into the chamber 15 through the opening 18, and thence into the tube 17, to emerge from its lower extremities in a series of bubbles which will rise through the mass of liquid material 11 contained within the latter chamber.

A differential pressure gauge or manometer 20 comprises a chamber portion 21 containing a quantity of mercury or other heavy liquid 22 upon which floats an inverted bell 23. The bell 23 is attached to an extended lever arm 24 fixed to a rotatable spindle 25, which passes through a suitable pressure type seal in the case of the chamber 21 and carries, externally to said case, an index or pointer 26 adapted to provide on a scale 27 a measure of the deflected position of said pointer, and, therefore, of the vertical height of the bell 23. A conduit 28, being a branch of the tube 16, enters the bottom portion of the chamber 21, passing upward through the liquid contained therein and into the bell 23. Attached to the upper portion of the chamber 21 is a conduit 29, through which air may be admitted to the interior of said chamber. It will be apparent that, according to the well-known principle of the bell-type manometer, the vertical position of the bell 23, as indicated by the pointer 26 on the scale 27, will be a measure of the difference between the pressures existing in the conduits 28 and 29. Compressed air from a source 30 is made available through a regulator 31 to a conduit 32, at a pressure suited to the range of the manometer 24. The conduit 16 with its branch 28 is connected to the conduit 32 through a control valve 33, whereby the rate of air flow may be adjusted.

A chamber 34, similar in general structure to the chamber 15, is provided with a flat bottom, and has its upper portion open to the atmosphere. A short section of capillary tube 35 passes through the bottom of the chamber 34 terminating flush with the inner surface thereof, and is connected to the conduit 29 which is also in communication with the conduit 32 through a control valve 37, whereby the rate of flow of air from the latter to the former conduit may be adjusted. By using a capillary tube terminating in an orifice in the bottom of the chamber 34, the entry of liquid thereto from said chamber is prevented, and the vertical position of said orifice positively established as coincident with the level of said bottom.

Operation of the apparatus as thus far described may first be considered without any liquid in either of the chambers 15 and 34. It may be assumed that the chamber 10 is filled to overflowing with a body of liquid 11 whose density is to be determined. Upon air being admitted from the source 30 through the regulator 31 to the conduit 32, and thence through the valves 33 and 37 to the conduits 16 and 35 respectively, there will be built up a differential pressure within the manometer 20. There being no liquid within the chamber 34, the pressure in the conduit 35 will be communicated directly through the conduit 29 to the upper portion of the manometer body 20. There being no liquid in the chamber 15, the pressure within the conduits 16 and 28 will not be affected by the presence of said chamber, and said pressure will be applied to the bubbling tube 17. There will thus be built up in said bubbling tube and last-named conduit a back-pressure dependent upon the density of the liquid 11 and the depth of the outlet of tube 17 below the surface of said liquid. The bell 23 in the manometer 20 will assume a vertical position dependent upon the difference of the pressures in the conduits 29 and 16, and therefore the pointer or index 26 will provide upon the scale 27 a measure of the density of said liquid. The operation as thus far described possesses no novelty, and for it no invention is herein claimed.

It may now be assumed that a body of liquid (which may or may not be the same as that in the chamber 11) is placed in the chamber 34 covering the opening of the capillary tube 35 in the bottom thereof. It will be seen that the stream of air passing through the capillary 35 to the chamber 34 will bubble out through said opening and will encounter a back-pressure dependent upon the density of the liquid in the chamber 34 and upon the height of its surface above the opening. Under selected conditions said back-pressure may be made to correspond to that which would be developed in the bubbling tube 17 if the chamber 10 were filled with a standard liquid. By this expedient, the zero of reference may be suppressed, and the range of the manometer 20 correspondingly expanded until the scale 27 represents only the expected variation of the density of the liquid 11 from that of a standard liquid.

Since the back-pressure developed by the passage of air through the body of liquid in the chamber 34 will vary with the thermal conditions of said liquid, it follows that, in order to render constant the effect of said back-pressure, it will be necessary to provide a compensation for changes in said thermal conditions. It will be observed that, while an increase in the temperature of said liquid will produce a reduction in its density, it will at the same time cause the liquid to expand, raising the level of its surface by a certain increment, and that, therefore, the two effects consequent upon change of temperature in said liquid will tend to have opposing influences upon the back-pressure. It may be shown that if the bottom of the chamber 34 is made flat, with the orifice formed by the opening of the capillary tube thereinto flush with the interior bottom surface, and said chamber formed with vertically disposed side walls and of any uniform cross-section, this compensation may be made complete, and the back-pressure developed in said chamber caused to be constant under all temperature conditions. Should it be found that changes in dimensions of the chamber 34 itself with variations in temperature produce an appreciable effect on results, said chamber may be formed of material (such as Invar, of a suitable composition of glass) having an expansion coefficient sufficiently low to render negligible this source of error.

Results equivalent to those obtained with the chamber 34, as shown in Fig. 1, may be secured by the use of a modification as indicated in Fig. 3. The cylindrical chamber 34 of Fig. 1 is replaced by a vessel 36 open or vented to the atmosphere and having a downwardly directed vertical leg 36' into which is extended a vertical bubbling tube 38, said leg being of uniform cross-section. The bubbling tube 38 extends as a hollow cross-section to the point 39. For the same reason as pointed out in describing the disposition and proportioning of the tube 16 in Fig. 1, the bubbling tube 38 extends, preferably, to the bottom of the leg 36', in the form of a solid rod or cross-section. Both components are vertically disposed and of uniform diameter. Pierced through the side of the bubbling tube 38 within the leg 36', at the junction of the hollow and solid cross-sectional members of the tube 38, is a small opening or orifice 39. The tube 38 is in communication with the conduit 29. By suitably selecting the relative dimensions of the vessel 36, its leg 36', and the tube 38, in relation to the density and expansion characteristics of the filling liquid, the orifice 39 may be so positioned vertically that the desired constant back-pressure will be developed without regard to temperature variation.

As hereinbefore pointed out, a compensation for changes in density of the measured liquid 11 in the chamber 10 may be provided by the bubbling tube 16 in the inner chamber 15. A reference temperature is selected corresponding to the lowest temperature which will be attained by the liquid under measurement; and at that temperature the vertical position of the vent 18 and of the surface of the liquid within the chamber 15 are brought into agreement. Thus the only back-pressure developed in the tube 16 at this reference temperature will be that due to the back-pressure in the tube 17. Should the temperature of the liquid 11 rise, and this change be communicated to the the liquid in the chamber 15, the surface of the latter will rise, covering the opening 18, causing a corresponding back-pressure to be developed against the escape of air from the tube 16, which back-pressure will be added to that developed in the tube 17 due to the escape of air through the liquid 11, and will be equivalent to adjusting the reference zero of the manometer 20 by a corresponding amount. By suitably proportioning the dimensions of the chamber 15, and the tube 16, and suitably positioning the opening 18 in the latter, it will be possible, with a filling liquid of predetermined density, to obtain a variable zero suppression which will exactly compensate for density changes due to variation of temperature in the measured liquid.

In Fig. 2 is shown an alternative form of density-determining device, embodying the principles of the invention, but differing from the form shown in Fig. 1 in several mechanical features. Contained in a open vessel or tank 40 is a body of liquid 41 upon whose density it is desired to obtain a continuous measurement. The vessel 40 is provided with a weir 42 whereby the surface of the body of liquid 41 is maintained at a substantially constant level. A bubbling tube 43 is connected to a regulated supply of compressed air by valve and regulator means not shown in the drawing, but which may be identical in all respects to the means for supplying air to the tubes 16 and 29 in Fig. 1. The tube 43 extends into the liquid 41 a predetermined vertical distance below the weir 42, whereby the surface of the liquid will be maintained at a fixed height or head above the outlet of said tube. A mercury float-type manometer 44 including a chamber 45, wherein a float 46 rests on a body of mercury 47, is connected to measure the pressure in the tube 43, and in such a manner that an increase in such pressure will cause the float 46 to rise. The float 46 is connected to a lever arm 48 which actuates an indicating pointer 49 through a temperature compensating mechanism 50, hereinafter to be described, said pointer co-operating with a graduated scale 51 to provide a measure of the pressure in the tube 43 and thus of the density of a column of the liquid 41 represented by the constant immersion depth of the tube 43. The lowest position attainable by the float 46 and arm 48 is determined by a stop member 46' mounted within the chamber 45 below said float. Since, as pointed out in connection with the form of the invention illustrated in Fig. 1, the determination of liquid density is most expediently carried out with a "partial scale" instrument, having a suppressed zero, means are provided for effecting this result by applying a constant force to the manometer float. Upon the float 46 rests a weight 52 adjusted to a predetermined value such that with increase of the differential pressure applied to the manometer 44, the pointer 49 does not leave its zero position on the scale, as determined by engagement of the arm 48 with the stop 46', until that pressure attains a value corresponding to a standard density of the liquid under measurement. Thus, the range of the manometer may be expanded until the scale 51 represents only the expected variation of density of the liquid 41 above that of a standard liquid. It will be obvious that the zero-suppressing device 34 of Fig. 1, or its form shown in Fig. 3, may be used instead of the weight 52 in the form of invention shown in Fig. 2, and that, conversely, in the form of the invention shown in Fig. 1, a weight similar to the weight 52 in Fig. 2 may be placed upon the bell 23, thereby replacing the liquid-back-pressure form of zero suppressor.

The temperature compensator 50 provides means alternative to the auxiliary chamber 15 and bubbling pipe 16 of Fig. 1 for superposing upon the indicating pointer such adjustments as will neutralize the effect of changes in temperature of the measured liquid, and may take any one of a number of well known mechanical embodiments. In Fig. 4 is shown a form in which the compensating principle is incorporated in a relatively simple mechanical linkage. The lever arm 48 and the pointer 49, hereinbefore mentioned as elements in the mechanism, are independently pivoted for angular displacement about parallel axes carried by a base-plate 53 mounted in the compensator 50. Angularly deflectable with the pointer 49 is a horizontally extended lever arm 55 having near its free extremity a pivot bearing 56. Positioned on the arm 48 a horizontal distance from the axis of the latter equal to that of the bearing 56 from the axis of the pointer 49 is a pivot bearing 57. Horizontally extending from the bearing 57 is a differential or floating lever 58, connected at one extremity to said bearing 57, and at the other extremity, by means of a short vertical link 59, to the bearing 56, and having a further pivot bearing 60 midway said extremities. (It will be apparent that if the bearing 60 be given a fixed location with respect to the base-plate 53 the pointer arm 49 will have imparted to it angular displacement substantially equal to any of which the arm 48 may partake, and will provide a measure of the deflected position of said last-named arm.)

Fixed at one extremity to the base-plate 53, is a Bourdon tube 61 having a free extremity adapted to be deflected in a vertical sense as seen in the drawing in response to variations of fluid pressure within said tube. A bulb or closed vessel 63 positioned within the tank 40 in a manner to partake of the average temperature of the body of liquid therein, contains a volatile or expansible fluid, and is placed in communication with the Bourdon tube 61 by means of an extended capillary tubing 64. Thus, pressure changes within the bulb 63 due to changes of the temperature to which it is exposed will be impressed upon the Bourdon tube 61, causing the free extremity of the latter to be deflected and to assume positions corresponding to said temperature.

Pivotally mounted on the base-plate 53 is a horizontally extended arm 65 having on its free extremity a pivot bearing articulated to the free extremity of the Bourdon tube 61 by means of a link 66, whereby said arm will be angularly deflected about its pivot bearing to positions corresponding to the displacement of said Bourdon tube. Formed in the arm 65 is an arcuate slot 67 substantially concentric with the pivot bearing 60 on the arm 58. A block 68 is movable in the slot 67, and is pivotally attached by means of a link 69 to the bearing 60, whereby the vertical position of said bearing will be varied by angular displacement of said arm 65. A manually actuated screw 70 extended between a nut 71 on the free extremity of the arm 65 and a suitable abutment 72 pivoted on the block 68 provides a micrometer adjustment, whereby said block may be located at will in any desired position with respect to the slot 67, thereby varying the magnitude of the effect of angular displacement of the Bourdon tube 61 upon the vertical position of the pivot bearing 60. The floating lever 58 is thus provided with a temperature-sensitive movable fulcrum, whereby the scale-position or zero-setting of the pointer 49 with respect to the position of the arm 48 will be varied in response to temperature changes in the liquid whose density is being determined. At the same time, the extent to which temperature-compensation is effective in modifying the pointer setting in response to a given temperature change may be varied at will by adjustment of the thumb screw 70.

The terms and expression which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In an instrument for determining the density of a liquid, means for bubbling a gaseous medium through a predetermined depth of said liquid, means responsive to the pressure required to bubble said gaseous medium through said predetermined depth, said pressure-responsive means comprising a reference part and a part adapted to be deflected in response to variations in said pressure to provide by its position with respect to said reference part a measure of said pressure, means for maintaining a zero relationship between said deflectable part and said reference part until said pressure exceeds a predetermined value corresponding to the density of a standard liquid, the last-mentioned means comprising a container for said standard liquid adapted to be connected to a gaseous medium and to said pressure-responsive means for subjecting said pressure-responsive means to a pressure developed in the bubbling of said gaseous medium through said standard liquid, said container being dimensioned in relation to the characteristics of said standard liquid to provide for an increase in height of a column of said liquid upon increase in temperature thereof to balance the effect of decrease in density of said liquid and maintain said bubbling pressure substantially constant despite said temperature increase.

2. In an instrument for determining the density of a liquid, means for bubbling a gaseous medium through a predetermined depth of said liquid, a differential pressure means responsive in one direction to the pressure required to bubble said gaseous medium through said predetermined depth, said pressure-responsive means comprising a reference part and a part adapted to be deflected in response to variations in said pressure to provide by its position with respect to said reference part a measure of said pressure, means for maintaining a zero relationship between said deflectable part and said reference part until said pressure exceeds a predetermined value corresponding to the density of a standard liquid, the last-mentioned means comprising means for subjecting said pressure-responsive means in the opposite direction to a pressure developed in the bubbling of a gaseous medium through said standard liquid and for maintaining the last-mentioned pressure constant despite variations in temperature in said standard liquid, and fluid-pressure actuated means responsive to changes in the temperature of the first-mentioned liquid for superimposing upon the measurement provided by said pressure-responsive means a zero-shift corresponding to said temperature changes.

3. In an instrument for determining the density of a liquid, means for bubbling a gaseous medium through a predetermined depth of said liquid, manometer means comprising an element movable in response to different pressure magnitudes, means for applying to said element in one direction the pressure necessary to bubble said gaseous medium through said predetermined liquid depth, a container for a standard liquid adapted for connection to a gaseous medium for bubbling of said medium through said liquid, said container being dimensioned in relation to the characteristics of said standard liquid to provide for an increase in height of a column of said liquid upon increase in temperature thereof to balance the effect of decrease in density of said liquid and maintain substantially constant the pressure necessary to bubble said gaseous medium through said standard liquid despite said temperature increase, and means for applying the last-mentioned pressure to said movable manometer element in the direction opposite to that in which the first-mentioned pressure is applied.

4. In an instrument for determining the density of a liquid, means for bubbling a gaseous medium through a predetermined depth of said liquid, manometer means comprising an element movable in response to different pressure magnitudes, means for applying to said element in one direction the pressure necessary to bubble said gaseous medium through said predetermined liquid depth, means for bubbling a gaseous medium through a standard liquid and for maintaining constant the pressure necessary to effect said bubbling despite changes of temperature in said standard liquid, means for applying the last-mentioned pressure to said element in the direction opposite to that in which the first-mentioned pressure is applied, and means responsive to temperature changes in the first mentioned liquid for correspondingly modifying said first-mentioned pressure to compensate for said temperature changes.

5. In an instrument for determining the density of a liquid, means for bubbling a gaseous medium through a predetermined depth of said liquid, manometer means comprising an element movable in response to different pressure magnitudes, means for applying to said element in one direction the pressure necessary to bubble said gaseous medium through said predetermined liquid depth, a vessel of predetermined dimensions for containing a selected quantity of a standard liquid, means for supplying a stream of a gaseous medium through an opening below the surface of said standard liquid for bubbling said medium therethrough, the dimensions of said vessel and the characteristics of said liquid being such that changes in the pressure necessary to bubble said gaseous medium due to variations in density of said standard liquid with temperature changes will be balanced by changes in depth of said standard liquid due to its change in volume attendant upon said temperature changes, and means for applying the last mentioned pressure to said manometer element in the direction opposite to that in which the first mentioned pressure is applied.

6. In an instrument for determining the density of a liquid, means for bubbling a gaseous medium through a predetermined depth of said liquid, manometer means comprising an element movable in response to different pressure magnitudes, means for applying to said element in one direction the pressure necessary to bubble said gaseous medium through said predetermined liquid depth, a vessel of predetermined dimensions for containing a selected quantity of a standard liquid, means for supplying a stream of a gaseous medium through an opening below the surface of said standard liquid for bubbling said medium therethrough, the dimensions of said vessel and the characteristics of said liquid being such that changes in the pressure necessary to bubble said gaseous medium due to variations in density of said standard liquid with temperature changes will be balanced by changes in depth of said standard liquid due to its change in volume attendant upon said temperature changes, means for applying the last mentioned pressure to said manometer element in the direction opposite to that in which the first-mentioned pressure is applied, and means responsive to temperature changes in the first mentioned liquid for correspondingly modifying said first mentioned pressure to compensate for said temperature changes.

7. In an instrument for determining the density of a liquid, a container for said liquid, means for bubbling a gaseous medium through a predetermined depth of said liquid, manometer means comprising an element movable in response to different pressure magnitudes, a second container for a supply of liquid mounted in temperature exchange relation with the first mentioned liquid, a conduit extending into said second container and having an opening for the escape of gaseous medium therethrough into said first container, said opening being disposed in a predetermined position with respect to the surface of the liquid in said second container when said liquid is at a predetermined temperature whereby the pressure necessary to bubble gaseous medium through said liquid in said second container will vary with changes in said temperature, and means comprising a connection between said conduit and said manometer elemen for applying to said manometer element the pressure necessary to bubble gaseous medium through the liquids in said containers in series relationship.

8. In an instrument for determining the density of a liquid; means for bubbling a gaseous medium through a predetermined depth of said liquid, pressure-measuring means, and temperature compensating means comprising a vertically disposed closed container, a body of expansible liquid therein, said container being in temperature-exchange relation with said liquid whose density is to be determined whereby said body of liquid may vary its level in said container substantially with changes in temperature of said first liquid, the horizontal cross-section of said container, at least throughout the range of expansion of said contained liquid, being constant in area, means for bubbling gaseous medium through said contained liquid from an orifice having a predetermined vertical position in said container, said container being pneumatically in series with said first-named bubbling means and said pressure-measuring means, whereby to apply to said pressure-measuring means the sum of the pressure required to bubble said gaseous medium through said predetermined depth of said first-named liquid and that required to bubble the same through said contained liquid.

9. In an instrument for determining the density of a liquid, a container for said liquid, a conduit extending into said container to a predetermined depth, a second container for a supply of liquid mounted in temperature exchange relation with the first mentioned liquid, a conduit extending into said second container and having an opening for the escape of gaseous medium therethrough, said opening being disposed in a predetermined position with respect to the surface of the liquid in said second container when said liquid is at a predetermined temperature whereby the pressure necessary to bubble gaseous medium through said liquid in said second container will vary with changes in said temperature, the first mentioned conduit being connected to said second container for receiving gaseous medium bubbled through the liquid in said second container and conveying said medium to the liquid in the first container, manometer means comprising an element movable in response to different pressure magnitudes, and means for applying to said manometer element the pressure necessary to bubble gaseous medium through both said liquids.

10. In an instrument for determining the density of a liquid, a container for said liquid, a conduit extending into said container to a predetermined depth, a vertically disposed closed container for a supply of liquid mounted in temperature exchange relation with the first mentioned liquid, a conduit extending into said second container and having an opening for the escape of gaseous medium therethrough, said opening being disposed in a predetermined position with respect to the liquid in said second container when said liquid is at a predetermined temperature, the horizontal cross section of said second container being constant in area throughout at least the range of expansion of the liquid therein, means for bubbling gaseous liquid through the liquid in said second container by way of the second mentioned conduit and thence through the liquid in the first container by way of the first mentioned conduit, and manometer means responsive to the pressure necessary to bubble gaseous medium through both said liquids.

ROBERT D. COWHERD.

REFERENCES CITED

The following references are of record in the file of this patent:

UNITED STATES PATENTS

| Number | Name | Date |
| --- | --- | --- |
| 1,660,503 | Greenfield | Feb. 28, 1928 |
| 1,761,295 | Greenfield | June 3, 1930 |
| 2,205,678 | Adams | June 25, 1940 |
| 2,321,175 | Binckley | June 8, 1943 |
| 2,347,637 | Sprenkle | Apr. 25, 1944 |
| 2,394,549 | Howe | Feb. 12, 1946 |